March 29, 1960
G. B. MILLER ET AL
2,930,947
SOLENOID CONTROLLED VALVE
Filed Sept. 27, 1954
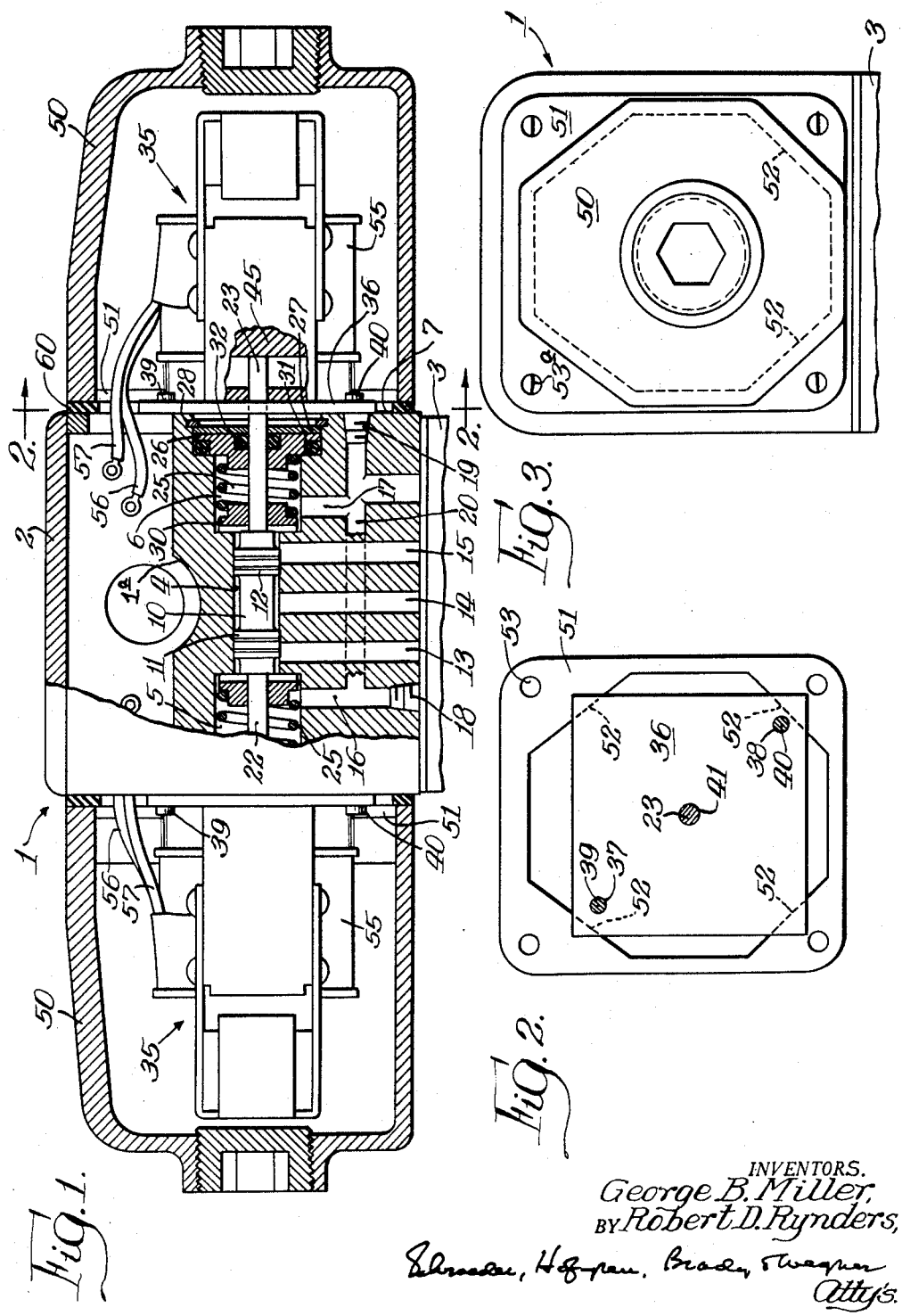
INVENTORS.
George B. Miller,
BY Robert D. Rynders,
Attys.

2,930,947

SOLENOID CONTROLLED VALVE

George Benjamin Miller and Robert D. Rynders, Racine, Wis., assignors to Racine Hydraulics & Machinery, Inc., a corporation of Wisconsin Application September 27, 1954, Serial No. 458,628

2 Claims. (Cl. 317—191)

This invention relates to a solenoid controlled valve and, more particularly, to a new mode of construction for securing the solenoid to the valve body which facilitates assembly and removal of the solenoid from the valve body and provides for better and safer operation thereof.

An object of this invention is to provide a new and improved solenoid controlled valve.

Another object of the invention is to provide a solenoid controlled valve wherein the solenoid is mounted at an end of the valve body and enclosed by a solenoid cover, the parts being so constructed and arranged as to prevent operation of the solenoid when the solenoid cover is removed which provides an electrical safety feature and keeps the solenoid from being operated without a cover and thus being contaminated by dirt or other foreign matter which might cause malfunctioning of the valve.

Another object of the invention is to provide a solenoid controlled valve wherein the solenoid and its cover are secured to an end of the valve body in a manner whereby they may be removed in a direction substantially transverse to the center line of the valve member with only slight movement in a direction longitudinally thereof which reduces the space required beyond the valve body for removal of the cover.

Another object of this invention is to provide a solenoid controlled valve, which may function as a pilot valve, having a valve body, a solenoid mounted at one end thereof, means for accurately aligning the solenoid with the valve body, and a solenoid cover enclosing the solenoid secured to the valve body and securely holding the solenoid to the valve body whereby the solenoid may only be operated with the solenoid cover in place to insure safety of operation from an electrical standpoint and to keep the solenoid from contamination by dirt or other foreign matter which may cause malfunctioning of the valve.

Still another object of the invention is to provide a solenoid controlled valve wherein a valve body is provided with a valve chamber therein and a compartment connecting said chamber and an end face of the valve body, a valve member mounted in said chamber and having a valve stem extending outwardly through said compartment and beyond the end face of the valve body, a pair of spaced apart dowel pins projecting outwardly from said end face, a solenoid having a base plate abutting said end face and provided with openings for receiving said dowel pins and the outwardly extending valve stem to align the solenoid with respect to the valve body, a solenoid cover enclosing said solenoid and having a base provided with an opening the edges of which overlap the base plate of the solenoid, and means for securing the solenoid cover to the valve body with the solenoid base plate confined therebetween, whereby the solenoid is held in operative position by the solenoid cover so that removal of the solenoid cover prevents effective movement of the valve member when the solenoid is energized and a slight movement of said cover and solenoid in a direction longitudinal of the center line of the valve member withdraws the solenoid base plate from the dowel pins and the valve stem whereby the solenoid and solenoid cover may be removed in a direction transverse to the center line of the valve member resulting in a conservation of space necessarily allowed for removal of the parts for maintenance purposes.

The objects of the invention generally set forth, together with other ancillary advantages, are attained by the construction and arrangement shown by way of illustration in the accompanying drawing, in which:

Fig. 1 is a side elevation view of the solenoid controlled valve, shown as a pilot valve, partially in section and with parts broken away;

Fig. 2 is a vertical section taken along the line 2—2 in Fig. 1; and,

Fig. 3 is an end view in elevation of the valve looking at the right hand end of Fig. 1.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

As shown in the drawings, the solenoid controlled valve, indicated generally at 1, may be in the form of a pilot valve having a valve body 1a having a cover 2 which is fastened to a main valve body shown fragmentarily at 3 having a valve member therein (not shown) which is to be controlled by the pilot valve 1.

The valve body 1a has a valve chamber 4 formed therein and compartments 5 and 6 extending outwardly from the valve chamber 4 to the end faces of the valve body 1a, one of these end faces being shown at 7.

A valve member 10 is slidably mounted in the valve chamber 4 and has lands 11 and 12 for controlling the flow of fluid through a plurality of passages 13, 14 and 15 in the valve body. A pair of passages 16 and 17 connect with the compartments 5 and 6. The passages 16 and 17 are plugged at 18 and 19 and form drain passages interconnected by passage 20. The above passages communicate with associated passages (not shown) in the valve body 3.

The valve member 10 has valve stems or plungers 22 and 23 extending from opposite ends thereof through the compartments 5 and 6, respectively, and outwardly beyond the end faces of the valve body 1a.

The parts mounted in each of the compartments 5 and 6 are identical as the mechanism attached to each end face of the valve body 1a, therefore, a description of the parts mounted in the compartment 6 and the parts mounted adjacent the end face 7 is believed to suffice.

The valve stem 23 is surrounded by a spring 25 which acts between a plug 26 secured in the compartment 6 by a plate 27 and a snap ring 28 and a slidably mounted disc 30. These parts function to return the valve to its normal center position. In order to effect a fluid seal, a pair of O-rings 31 and 32 are provided.

In order to shift the valve member 10, a conventional solenoid 35 is mounted adjacent each end of the valve body against the end face thereof, such as end face 7. The solenoid 35 has a base plate 36 which abuts the end face 7. The base plate 36, as shown in Fig. 2, is in a generally square shape but may be of any other suitable shape and is provided with openings 37 and 38 for receiving a pair of relatively short aligning members in the form of dowel pins 39 and 40 extending outwardly from the end face 7 of the valve body 1a. The base plate 36 also has a central opening 41 through which the valve stem or plunger 23 extends to a position within the solenoid, as shown in Fig. 1.

It will be noted in Fig. 1 that the end of the valve stem 23 abuts against a slidable member 45 within the solenoid so that as the solenoid is energized, the slidable member 45 will move to the left as shown in Fig. 1 to shift the valve member 10 against the action of the spring 25 in the compartment 5. Similarly, energization of the other solenoid 35 will shift the valve member 10 to the right looking at Fig. 1 against the action of the spring 25 in the compartment 6.

It will thus be seen that the dowel pins 39 and 40 and the valve stem or plunger 23 function to accurately align the solenoid for operation. A solenoid cover 50 is provided which encloses the solenoid 35 and in order to securely hold the solenoid 35 against the end face 7 it has a base 51 provided with edges 52 forming an opening of a size less than base plate 36 so that the edges 52 of the opening overlap the corners of the base plate 36. The base 51 of the solenoid cover has openings 53 through which bolts 53a may pass and extend into the valve body 1a to secure the solenoid cover 50 to the valve body 1a with the base plate 36 of the solenoid confined therebetween.

It is believed obvious that the shape of the solenoid base plate 36 and the opening in the solenoid cover base 51 need not necessarily be that shown, the only requirement being that the edge or edges of the opening in the base 51 be so arranged that they overlap portions of the base plate 36 of the solenoid 35.

As in conventional solenoid construction, the coil is shown at 55 and the wires 56 and 57 supply current to the coil.

It is believed obvious from the foregoing that a construction has been provided wherein the solenoid may be readily aligned by dowel pins 39 and 40 and the valve stem 23 all of which extend a relatively short distance beyond the end face 7 of the valve body 1a. The function of the above-mentioned dowel pins and valve stem is solely that of aligning the solenoid and the solenoid is securely held to the valve body 1a by the solenoid cover 50. Thus, the solenoid may only properly operate to shift the valve member 10 when it is securely held to the valve body 2 by the solenoid cover 50 which constitutes unitary means for enclosing the solenoid and holding the solenoid securely against the valve body. This is important because it is highly desirable to have the covers over the solenoids both from an electrical safety standpoint and to keep the solenoids from being contaminated by dirt or other foreign matter.

In order to entirely seal the solenoid 35, a gasket 60 substantially equal to the thickness of the solenoid base plate 36 is positioned between the valve body 1a and the solenoid cover base 51.

It will also be seen from the above description that the solenoid cover 50 and solenoid 35 may be removed from the valve body 1a with a minimum amount of movement in a direction longitudinal of the center line of the valve member 10. This is accomplished by removal of the solenoid cover securing bolts 53a which permits movement of the solenoid cover 50 away from the valve body a sufficient distance to withdraw the solenoid base plate 36 away from the dowel pins 39 and 40 and the valve stem 23 and then the solenoid cover and solenoid may be moved away from the valve body 1a in a direction transverse to the center line of the valve member. It will be seen that it is not necessary to remove the cover 50 entirely from the solenoid 35 before the solenoid may be removed from the valve body 1a.

The snap ring 28 functions to maintain the parts within compartments 5 and 6 from falling therefrom when a solenoid 35 is removed.

We claim:

1. In a body and solenoid combination, a body, a slidable stem extending outwardly beyond an end of the body, a pair of spaced dowel pins projecting outwardly from said end of the body, a solenoid mounted at said end of the body for shifting said stem, and means for mounting said solenoid in accurate rigid alignment with the body including a base plate for the solenoid having a pair of openings for receiving the dowel pins and a central opening for receiving the outwardly extending stem, and a cover for the solenoid having a base of a greater area than the base plate with an opening having edges overlapping said base plate whereby the base of the solenoid cover confines the base plate of the solenoid against the end of the body, and bolt means passing through the cover base outwardly of the base plate periphery and engageable with the body for securing the solenoid cover to the body.

2. In combination, a body, a solenoid adjacent said body and means for securing the solenoid to the valve body including a pair of dowel pins projecting outwardly from an end face of the body, a base plate for the solenoid having openings adapted to receive the dowel pins and a central opening adapted to receive a movable stem, a solenoid cover enclosing said solenoid and having a base of a size to overlap and extend beyond the periphery of the base plate provided with an opening of a size less than that of the solenoid base plate in order to fit over the base plate and hold the solenoid to the body, and means extending between the body and cover beyond the base plate periphery for attaching the solenoid cover to the body with the base plate of the solenoid confined therebetween.

References Cited in the file of this patent

UNITED STATES PATENTS

| | | |
|---|---|---|
| 1,025,559 | Bliss | May 7, 1912 |
| 2,359,048 | Monroe | Sept. 26, 1944 |
| 2,404,349 | Brandt | July 23, 1946 |
| 2,404,514 | McClure | July 23, 1946 |
| 2,417,990 | Nardone | Mar. 25, 1947 |
| 2,516,362 | Bauer | July 25, 1950 |
| 2,634,086 | Johns | Apr. 7, 1953 |